June 21, 1938.  S. KONISHI  2,121,170
PROCESS FOR MANUFACTURING AN ENDLESS FILM RECORD FOR SOUND REPRODUCTION
Filed June 23, 1937
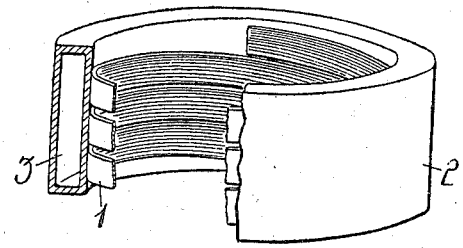
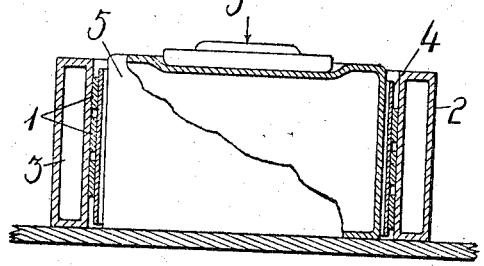
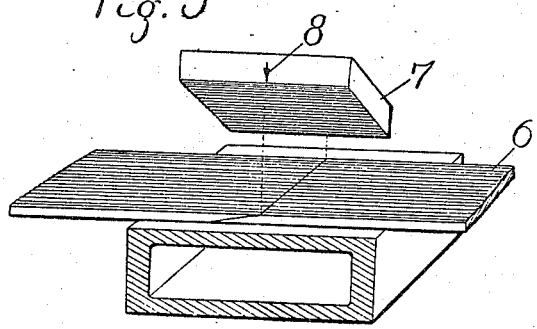

Patented June 21, 1938

2,121,170

UNITED STATES PATENT OFFICE 2,121,170

PROCESS FOR MANUFACTURING AN ENDLESS FILM RECORD FOR SOUND REPRODUCTION

Shozo Konishi, Kami-Mura, Japan

Application June 23, 1937, Serial No. 150,007
In Japan October 13, 1936

1 Claim. (Cl. 18—48.3)

This invention relates to a process for manufacturing an endless-film record for sound reproduction, which consists of a long strip of film jointed in endless manner and a number of sound grooves which have been impressed on the film as a continuous spiral track for the needle of a gramophone.

The object of this invention is to impress sound grooves on a long strip of film from a matrix previously made, and to joint the ends of the strip so as to accurately connect each sound groove to make a smooth continuous spiral track.

Two matrices of the record are employed to carry out this invention, and they are prepared in the following manner.

A long tape of wax ordinarily employed for sound reproduction is coated and connected around the rim of a wheel having a large diameter, say three meters, and the wheel is rotated on its axis at a proper liner speed. After the surface of the coated wax has been smoothly planed, a sound groove is recorded on the planed surface as a continuous spiral track with an ordinary sound recording machine, and the tape is cut at a marked point which is described hereinafter.

The wax tape is removed from the wheel rim, and helically wound on a cylindrical frame of about one meter in diameter and half a meter in length for galvanization, and a long metallic matrix is produced from this wax tape by a known galvanization process.

Another matrix which is called in this specification a retouching die is also prepared from the wax tape.

Before the long matrix above mentioned is prepared from the recorded wax tape by galvanization, a small matrix or retouching die about 3 centimeters in length is taken from a part of the tape in the neighbourhood of a point where the tape is to be cut when it is removed from the wheel rim. A line is marked on the side of the die to indicate the point where the wax tape is to be cut.

This retouching die can be manufactured by galvanization or by molten-metal jetting process, that is, metalicon process.

The manufacture of these matrices do not constitute a part of this invention.

The process of this invention consists of two steps. The first step is to manufacture a strip of plastic material on which the sound grooves have been transferred from a matrix, and the second step is to joint the ends of the strip to make it endless, smoothly connecting each sound groove.

In the accompanying drawing, Figures 1 and 2 are part sectional elevations of the instruments with which a strip of plastic material with sound grooves thereon is produced.

Figure 3 is a perspective view illustrating how the grooves at the joint are retouched.

*First step.*—The long matrix 1 of the record above mentioned is helically fitted along the inner surface of a metallic cylinder 2 with a jacket 3 about one meter in inner diameter and half a meter in length.

A thin cylinder 4 made of a plastic material as celluloid is loosely fitted in the bore of the cylinder on which the matrix has been helically fitted. A flexible cylindrical bag 5 made of India rubber is inserted in the cylinder of the plastic material, and compressed air or water is sent in the bag so as to press the plastic cylinder against the matrix on the bore of the metallic cylinder while the latter is heated by steam supplied in the jacket. If the bag is full of a fluid and closed, the required pressure can be imparted by merely pressing the bag at its end as shown in Figure 2.

By this means, the plastic material is pressed against the heated matrix, and the negative sound grooves on the matrix are transferred to the surface of the plastic cylinder as positive grooves.

The steam in the jacket is now replaced by cooling water, and the pressure in the bag is released. The plastic cylinder is easily removed from the matrix and can be taken out from the metallic cylinder. The plastic cylinder is then cut in spiral following the form of the matrix fitted in the metallic cylinder, so that a long strip 6 of a plastic material with sound grooves thereon is obtained. The blank part at each end of the strip where no grooves have been engraved is cut off leaving a short length of about three millimeters at either end.

*Second step.*—Each end of the strip 6 is cut off aslant in thickness, and the strip is spirally wound on a reel of a proper diameter. The ends of the strip are put together so as to overlap the aslant parts applying paste between them, and to place an end of each sound groove at an end of the strip in alinement with an end of the next groove at the other end of the strip. This can be done by merely registering the ends of marginal grooves engraved on each side of the strip.

On this overlapped part is placed the retouching die 7 so as to correctly coincide the negative grooves on the die with the grooves on the strip, by aid of a mark 8 fixed on the die's side showing the point which corresponds to the line where the wax tape was cut, and a pressure is given to the die while the overlapped ends are being heated. By this means, the sound grooves at the joint can be retouched, firmly connecting the ends in a uniform thickness.

What I claim is:—

A process for manufacturing endless film records for sound reproduction, comprising combination of a step which consists of loosely fitting a thin cylinder made of a plastic material in a metallic cylinder which is provided with a matrix of sound grooves spirally fitted on its inner surface, expanding a flexible bag inserted in the plastic cylinder so as to press the latter against the wall of the metallic cylinder while the latter is being heated so that the grooves of the matrix are transferred to the wall of the plastic cylinder, and helically cutting the latter into a long strip; and another step which consists of cutting the ends of the strip aslant in thickness leaving a short blank part on either end, spirally winding the strip in turns, overlapping the aslant cut ends of the strip, putting a paste between them so as to register an end of each sound groove at an end of the strip with an end of the next groove at the other end of the strip, and pressing the overlapped part with a retouching die while the part is being heated.

SHOZO KONISHI.